July 10, 1956

R. C. NORRIE 2,754,111

SPRING SUSPENSION

Filed June 29, 1953

INVENTOR.
Robert C. Norrie
BY

July 10, 1956

R. C. NORRIE 2,754,111

SPRING SUSPENSION

Filed June 29, 1953

INVENTOR.
Robert C. Norrie
BY
Barnes & Seed
attys

United States Patent Office 2,754,111
Patented July 10, 1956

2,754,111
SPRING SUSPENSION

Robert C. Norrie, Seattle, Wash., assignor, by mesne assignments, to Kenworth Motor Truck Company, Division of Pacific Car and Foundry Company, a corporation of Washington Application June 29, 1953, Serial No. 364,649

6 Claims. (Cl. 267—11)

This invention relates to a spring suspension, and particularly is directed to a suspension for springing the rear end of trucks and other like vehicles subjected to comparatively heavy loading and employing as the primary springing agent a plurality of spring leaves bound in a stack. For its general object the invention aims to provide a spring suspension engineered in a manner which will control side-sway without, in so doing, sacrificing riding quality, and additionally positioning the axle with reference to the vehicle frame.

It is a more particular object to devise a multiple-leaf spring assembly in which each of the two ends of the spring stack are slipper-mounted, and having a torsional stabilizer or sway bar connecting the axle to the frame as a complement to the spring stack.

A further particular object is to provide a spring suspension of the described character in which all points of connection from the stabilizer bar both with the frame and with the axle are rubber-mounted.

With the above objects in view and further aiming to provide such a spring suspension as will reduce stresses in the main leaf of the spring stack and by such token enable the spring to be designed either for longer life, a softer ride, or a combination of both, the invention consists in the novel construction and in the adaptation and combination of parts hereinafter described and claimed.

Figure 1:
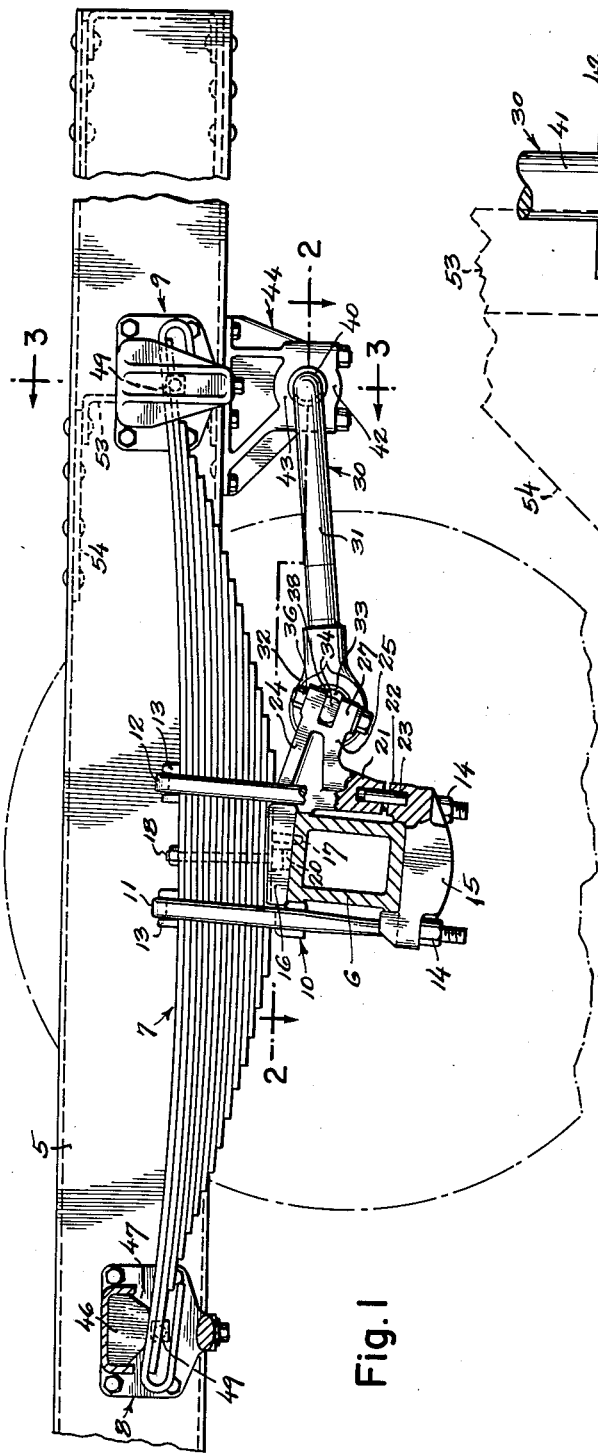
Figure 1 is a view partly in side elevation and partly in longitudinal vertical section, and with an associated vehicle frame shown framentarily, to illustrate a rear-end spring suspension constructed in accordance with the preferred teachings of the present invention.
Figure 2:
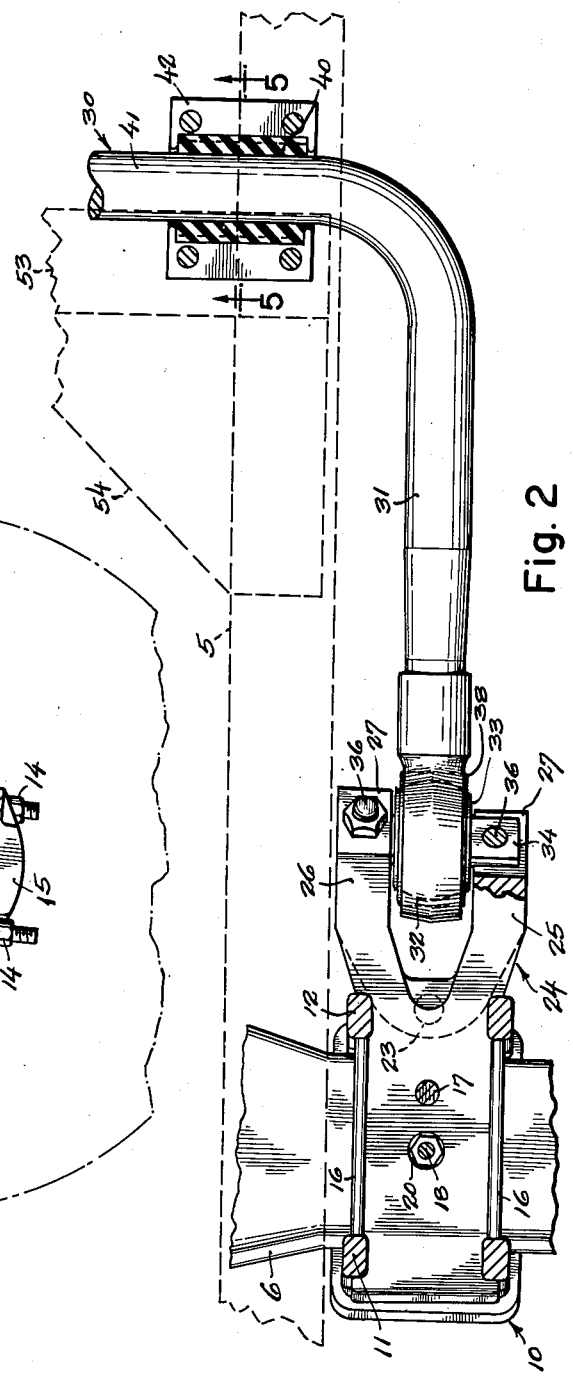
Fig. 2 is a fragmentary enlarged-scale horizontal sectional view thereof drawn on line 2—2 of Fig. 1.
Figure 3:
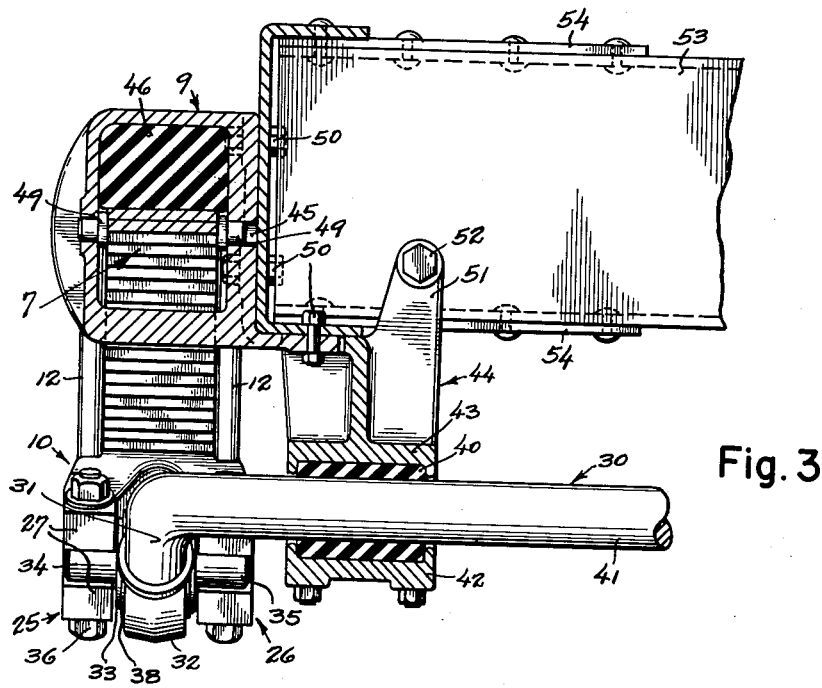
Fig. 3 is a fragmentary transverse vertical sectional view on line 3—3 of Fig. 1, employing the same scale as that of Fig. 2.
Figure 4:
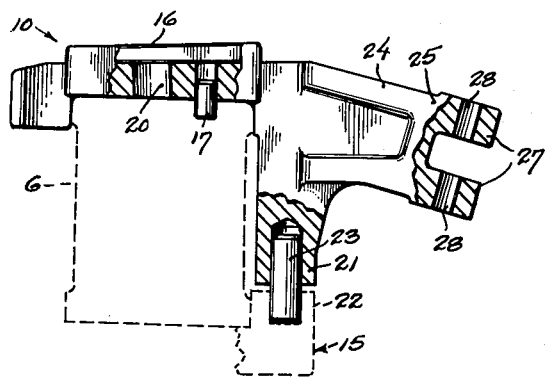
Fig. 4 is a detail view partly in side elevation and partly in longitudinal vertical section illustrating an axle-saddling bolster member employed in the present invention.
Figure 5:
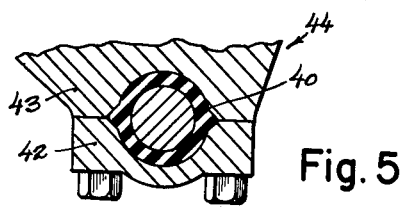
Fig. 5 is a fragmentary longitudinal vertical sectional view on line 5—5 of Fig. 2.

Referring to said drawings, the numeral 5 denotes one of the two channel members customarily employed as longitudinal principals in the frame of an automotive vehicle. The housing for the vehicle's driven rear axle (not shown) is designated by 6, and sustaining the frame from such axle housing is the customary set of spring leaves bound in a stack 7. Slipper brackets 8 and 9, which will be hereinafter particularly described, provide frame mountings for the front and rear ends, respectively, of the stack, and at the stack's mid-length the same finds a seat upon a bolster-member 10 which saddles the axle housing. The stack is made secure to the housing by the usual U-bolts 11 and 12 which bear upon stack-surmounting pads 13, the nuts 14 which complement said bolts taking their purchase against a stirrup 15 underlying the housing. Between the two U-bolts the side edges 16 of the bolster member project laterally beyond the spring stack and are raised somewhat so as to contain the stack. A dowel 17 localizes the bolster upon the axle housing. A center bolt 18 extends through openings in the stack for securing the leaves tightly together, and the head of this bolt lodges in an opening 20 of the bolster. The bolster 10 and its complementing stirrup 15 present opposed bosses 21 and 22, respectively, and presented by these bosses are registering sockets for a dowel 23.

Cast as an integral adjunct of the bolster so as to project rearwardly therefrom is an outrigger extension 24 terminating in a forked head. The two transversely spaced fork-arms 25 and 26 of this head are rearwardly directed and are themselves forked with the fork-arms 27 being in this instance vertically spaced. Such fork-arms 27 are drilled, as at 28.

The torsional stabilizer or sway bar of the present invention is designated by 30 and is formed to a U-shape, dimensioned so that the spanning distance from the axial center line of one to the axial center line of the other leg 31 corresponds to the center-to-center spacing between the principal fork at one side and the principal fork at the other side of the vehicle. These two legs terminate in bearing sleeves 32 which are co-axial, the sleeve of one leg relative to the sleeve of the other leg, and received in these terminal sleeves are respective wrist pins 33 each of which is formed with flat-sided trunnions 34—35 adapted to fit the slots described between said fork-arms 27. The journal portion of such wrist pins is ball-shaped. The trunnions are vertically bored to accommodate bolts 36 for rigidly securing the same to the forked head of the bolster. Rubber bushings 38 are received within the closed-end openings of the sleeves to provide resilient mountings for the wrist movement of the pins 33, the use of rubber eliminating need for lubrication and holding maintenance costs to a minimum by cushioning road shocks and reducing wear.

Connection from the stabilizer bar to the frame is obtained, at each side of the vehicle, by a rubber bushing 40 gripping the cross-arm 41 of the bar and placed under compression by the clamping action of a cap 42 boltably secured to a bearing block 43 provided by a hanger 44. The bushing may be composed of two complementary halves or a cut may be provided in the wall to enable the same to be fitted onto the bar. The hangers 44 one at each side of the vehicle, are or may be made an integral part of a casting which also includes the bracket 9 functioning as the slipper mounting for the spring stack's rear end. Said bracket 9, as with the bracket 8, presents a cavity 47 open to the front and rear and into which the spring end projects. Within this cavity there is contained a rubber block 46 bearing upon the housed spring end, and there is also received in the cavity, lodged within check sockets 45 at opposite sides of the housed spring end, a respective wear pad 49.

The two bracket castings 8 and 9 are each rigidly secured to the frame principals 10 by bolts 50, and to further secure the casting 9 in compensation of driving and braking forces which the hanger 44 passes from the bar 30 into the frame, said hanger presents an upstanding arm 51 and this arm is bolted, as at 52, to a framing cross-member 53 secured by gusset plates 54 to the longitudinal principals 10.

It is thought that the invention will have been clearly understood from the foregoing detailed description of my illustrated now-preferred embodiment. Minor changes in the details of construction will suggest themselves and I accordingly intend that no limitations are to be implied and that the hereto annexed claims be given a scope fully commensurate with the broadest interpretation which the employed language fairly permits.

What I claim is:

1. The connection between the sectionally rectangular axle of a vehicle and a spring beam extending transversely thereof and comprising a bolster having a close-fitting saddling engagement upon the axle and presenting a seat for the spring beam, a stirrup member closely fitting the underside of the axle and doweled to the bolster to hold the stirrup member and the bolster against relative movement in a direction longitudinally of the axle, and U-bolts overlying the spring beam and serving to securely clamp the axle between the bolster and the stirrup member and at the same time draw the spring beam against the seat.

2. The connection of claim 1 having a dowel interlocking the bolster to the axle to secure the bolster against movement longitudinally of the axle.

3. In a vehicle spring suspension employing at each side of the vehicle a respective longitudinal spring beam each mounted by the two ends from the vehicle frame, an axle underlying the spring beams at the approximate center thereof, a respective bolster for the center portion of each spring beam securely clamped between the axle and the related spring beam and presenting an extension projecting rearwardly from the axle and terminating in a fork, a spanning pin secured to the fork arms of said fork and presenting a ball-shaped central protuberance occupying the opening between said arms, a stabilizing means comprising a U-shaped torsion bar having the cross-arm of the U journaled from the frame for pivotal movement about a transverse horizontal axis spaced to the rear of said extension and having the two legs of the U each projecting forwardly into the opening of a respective said fork, said legs terminating in a sleeve having a ball-shaped chamber functioning as a journal for the ball-shaped protuberance provided by said spanning pin.

4. A suspension according to claim 3 in which the recited journals are rubber.

5. In a vehicle having resilient load supporting means between an axle and the vehicle frame, a respective bolster on which said means bears fixed to the axle adjacent each end thereof and presenting an extension terminating in a fork, a stabilizing means comprising a torsion bar journaled adjacent each of its ends from the frame for pivotal movement about a transverse horizontal axis spaced from the axle in a direction longitudinally of the vehicle and having at each end a respective lever arm rigid with the bar and extending therefrom into the opening of a related said fork, a respective spanning pin secured to the fork arms of each of said forks and presenting a ball-shaped central protuberance occupying the opening between said arms, the lever arms each terminating in a sleeve having a ball-shaped chamber functioning as a journal for the ball-shaped protuberance provided by said spanning pin, and a bushing of elastic rubber carried by the sleeve with its interior surface gripping the pin and its exterior surface gripped by the sleeve.

6. Structure according to claim 5 in which the journals for the torsion bar are rubber.

References Cited in the file of this patent

UNITED STATES PATENTS

| | | |
|---|---|---|
| 1,200,194 | Houdaille | Oct. 3, 1916 |
| 1,643,970 | Wilkins | Oct. 4, 1927 |
| 2,123,335 | Herreshoff | July 12, 1938 |
| 2,208,538 | Brown | July 16, 1940 |
| 2,253,645 | Paton | Aug. 26, 1941 |
| 2,387,874 | Bradley | Oct. 30, 1945 |
| 2,620,181 | Troche et al. | Dec. 2, 1952 |